(12) United States Patent
Hobbs

(10) Patent No.: US 7,280,242 B2
(45) Date of Patent: Oct. 9, 2007

(54) PRINTER CONTROL BASED ON MEDIA ATTRIBUTES

(75) Inventor: George Bradley Hobbs, Caldwell, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 801 days.

(21) Appl. No.: 10/191,611

(22) Filed: Jul. 9, 2002

(65) Prior Publication Data

US 2004/0008365 A1 Jan. 15, 2004

(51) Int. Cl.
G06F 3/12 (2006.01)
G06F 15/00 (2006.01)

(52) U.S. Cl. .................... 358/1.15; 358/1.9; 358/1.1

(58) Field of Classification Search ............... 358/1.15, 358/1.13, 1.12, 1.11, 1.9, 1.6, 1.2, 1.1, 407, 358/468, 1.16, 1.17, 3.23, 2.1, 520; 399/44, 399/45, 50; 347/14, 16, 23, 24, 26, 31; 710/15, 710/16
See application file for complete search history.

(56) References Cited

U.S. PATENT DOCUMENTS

| | | | |
|---|---|---|---|
| 5,467,119 A | 11/1995 | Richtsmeier et al. | |
| 5,711,621 A | 1/1998 | Austin | |
| 5,784,090 A | 7/1998 | Selensky et al. | |
| 5,854,652 A | 12/1998 | Andersen | |
| 5,925,889 A | 7/1999 | Guillory et al. | |
| 6,023,285 A | 2/2000 | Kocher et al. | |
| 6,030,066 A | 2/2000 | Li et al. | |
| 6,055,063 A * | 4/2000 | Yang et al. ................ | 358/1.15 |
| 6,075,548 A | 6/2000 | Gillen | |
| 6,173,295 B1 | 1/2001 | Goertz et al. | |
| 6,335,795 B1 * | 1/2002 | Neuhard et al. ........... | 358/1.15 |
| 6,618,162 B1 * | 9/2003 | Wiklof et al. .............. | 358/1.15 |
| 6,952,288 B2 * | 10/2005 | Yamada et al. ............. | 358/1.9 |
| 7,054,022 B2 * | 5/2006 | Kazama et al. ........... | 358/1.15 |

FOREIGN PATENT DOCUMENTS

| | | |
|---|---|---|
| EP | 0741488 | 11/1996 |
| EP | 0816931 | 1/1998 |
| GB | 1421474 | 1/1976 |
| GB | 1571698 | 7/1980 |
| JP | 9-99607 | 4/1997 |
| JP | 2000-66460 | 3/2000 |
| WO | WO01/81093 | 11/2001 |

* cited by examiner

Primary Examiner—Dov Popovici

(57) ABSTRACT

Various systems and methods are described to provide for printing a document on a printer in a manner that accounts for a number of attributes of a print media such as texture, absorption, and many other attributes. Specifically, a print job is received in a printer that includes a document to be printed on the printer. Thereafter, a number of media attributes of a print media associated with the print job are determined and a number of operational settings in the printer are then adjusted based upon the media attributes. The document is then printed on the printer using the print media specified in the print job.

30 Claims, 5 Drawing Sheets

Media Attribute Table

Texture = Value
Shininess = Value
Luminance = Value
Absorption = Value
Gloss = Value
Color Reflection = Value
Color Depth = Value
Graininess = Value
Whiteness = Value
Humidity = Value
Heat Dissipation = Value
Adhesion Value = Value
•
•
•

FIG. 3

Printer Settings Table

Fuser Temperature

| Dissipation | $x_0$ | $x_1$ | $x_2$ | $x_3$ | $x_4$ | ••• |
|---|---|---|---|---|---|---|
| Fuser Temp | $y_0$ | $y_1$ | $y_2$ | $y_3$ | $y_4$ | ••• |

Ink Flow Settings

| Absorption | $x_0$ | $x_1$ | $x_2$ | $x_3$ | $x_4$ | ••• |
|---|---|---|---|---|---|---|
| Ink Flow | $y_0$ | $y_1$ | $y_2$ | $y_3$ | $y_4$ | ••• |

PRINTER CONTROL BASED ON MEDIA ATTRIBUTES

BACKGROUND

Many different printers are available to print documents. Such printers may use any one of a variety of printing technologies to accomplish a printing operation. For example, there are laser printers, ink jet printers, dot matrix printers, and other types of printers. In some cases, the type of media can effect the printing on various ones of the different printer types in different ways. For example, when used in an ink jet printer, a particular media may absorb an excessive amount of ink such that the resulting image appears dull or faded, but images printed on the same media using a laser printer will appear quite sharp. Therefore, it may often be the case that certain media is avoided when printing with specific types of printers.

BRIEF DESCRIPTION OF THE SEVERAL VIEWS OF THE DRAWINGS

The invention can be understood with reference to the following drawings. The components in the drawings are not necessarily to scale. Also, in the drawings, like reference numerals designate corresponding parts throughout the several views.

FIG. 3 is a drawing of a media attribute table employed in the printing network of FIG. 1 according to an embodiment of the present invention;

FIG. 4 is a drawing of an exemplary printer settings table employed in the printing network of FIG. 1 according to an embodiment of the present invention;

DETAILED DESCRIPTION

Figure 1:
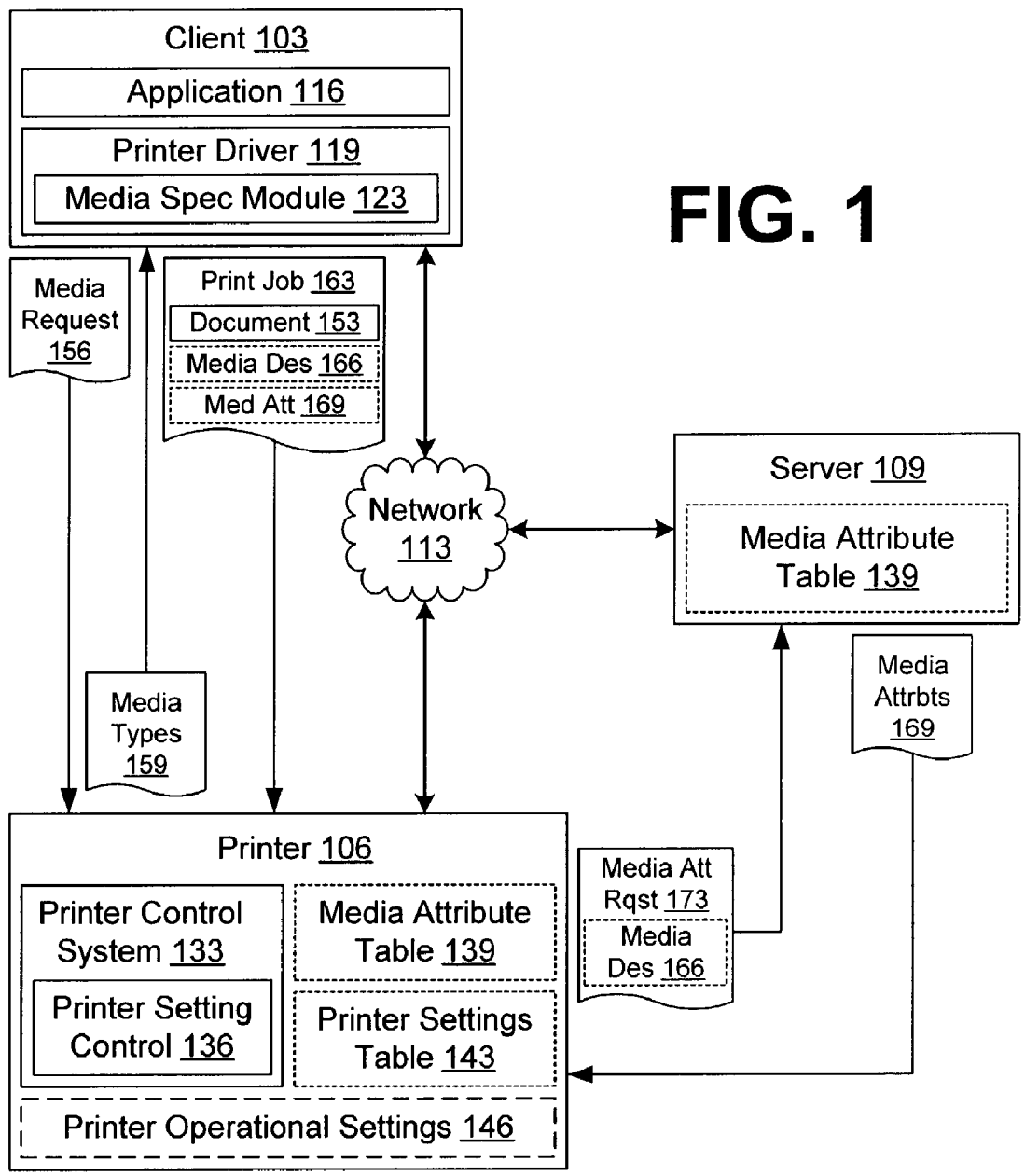
FIG. 1 is a block diagram of a printing network according to an embodiment of the present invention.

Turning to FIG. 1, shown is a printing network 100 according to an embodiment of the present invention. The printing network 100 includes a client 103, a printer 106, and a server 109, all of which are coupled to a network 113. In this respect, the network 113 may be, for example, the Internet, intranets, wide area networks (WANs), local area networks, wireless networks, or other suitable networks, etc., or any combination of two or more such networks.

The client 103 may be, for example, a computer system or other apparatus with like capability. The client 103 may include one or more applications 116 that executed by a processor circuit within the client 103. The applications 116 may be, for example, word processors, spreadsheets, graphic programs, or any other application that generates printed data using a printer 106. In order to facilitate the printing of a document generated by an application 116 in the client 103, the application 116 interfaces with a printer driver 119 that facilitates communication with the printer 106. The printer driver 119 includes a media specification module 123. The media specification module 123 facilitates a user specification of a media type to be employed in printing the document generated by the application 116. A "media type" is defined herein as classification of a media based upon physical structural properties that effect the nature and/or appearance of printed matter that is printed thereon by a respective printer. In this respect, the media type may be, for example, standard paper, bond paper, cotton based paper, standard paper, textured paper, a transparency, or other types of paper. The media types may include media constructed, for example, of paper (wood), plastic, fabric, cotton, metal, or any other material or a combination of any two or more of the above materials.

The printer 106 includes a printer control system 133 that also includes a printer setting control 136. Also, the printer 106 may include a media attribute table 139 and a printer settings table 143. Within the printer 106 are a number of printer operational settings 146 that may be adjusted based upon a media type associated with a document to be printed as will be discussed. The media attribute table 139 may also be stored on the server 109 and accessed by the printer 106 as is appropriate.

Next, a discussion of the operations of the printing network 100 in printing a document generated by the application 116 is provided. First, assume that a user manipulates the application 116 to create a document 153 that is to be printed on the printer 106. The application 116 interfaces appropriately with the printer driver 119 to cause the printing of the document 153. Upon initiating the print operation, the printer driver 119 uses the media specification module 123 to allow the user to specify the particular type of print media that is to be employed in printing the document 153.

In this respect, the media specification module 123 generates a media request 156 that is transmitted to the printer 106 to determine the media types that are available in the printer 106 for printing. Upon receiving the media request 156, the printer control system 133 responds by transmitting the media types 159 to the client 103. In the context of this discussion, the term "receiving" is defined herein as accepting data from the network 113 and storing the data as a file or other data structure in a memory device. The media types 159 are then presented to the user on a display device, for example, so that the user may select which media type is to be used for the printing of the document 153. When the selection is made, the printer driver 119 then generates a print job 163 that includes the document 153. The print job further includes a media designator 166 that informs the printer 106 of the specific media type 159 that is to be employed in printing the document 153. In addition, the print job 163 may also include a number of media attributes 169 that were either stored in the client 103, obtained from the server 109, or obtained from the printer 106. Even though the media attributes 169 could be included in the print job 163, such is not absolutely necessary as will be discussed.

Once the print job 163 has been created, it is transmitted to the printer 106 for printing. Upon receiving the print job 163, the printer control system 133 then executes or otherwise initiates the operation of the printer setting control 136. The printer setting control 136 provides for the adjustment of the printer operational settings 146 for optimal performance of the printer 106 in printing the document 153 on the designated media as identified by the media designator 166. In doing so, the printer setting control 136 scrutinizes the print job 163 to find the media designator 166 or the media attributes 169 if they are included therein.

If only the media designator 166 is present in the print job 163, the printer setting control 136 generates a media attribute request 173 that includes the media designator 166, and sends the media attribute request 173 to the server 109 so as to obtain the corresponding media attributes 169. The server 109 responds by providing the media attributes 169 from the media attribute table 139 included therein. The media attributes 169 are then sent back to the printer 106. In this manner, the manufacturer of the selected media can provide the attributes to the users of their product without the need to include such information within the millions of printers used for printing documents. Alternatively, rather than requesting the media attributes 169 from the server 109, the printer setting control 136 may consult the media attribute table 139 included in some embodiments of the printer 106. In yet another embodiment, the media attributes 169 may be stored in the client 103.

When the media attributes 169 are obtained, then the printer setting control 136 consults with the printer settings table 143 to obtain a number of printer settings based upon the media attributes 169. Thereafter, the printer operational settings 146 are adjusted to accord with the printer settings obtained. Finally, the document 163 is then printed on the printer 106.

The printer operational settings 146 may vary from printer to printer, depending on the particular printer type. Specifically, different types of printers include different types of printing mechanisms that can be adjusted to affect the printing in some manner. For example, in laser printers, the printer operational settings 146 may include, for example, a fuser temperature control, speed of operation, curl correction, or other printer operational settings, etc. Alternatively, the printer 106 may be an ink jet printer. In such case, the printer operational settings 146 may include, for example, an ink flow setting, a speed of movement of the ink jet head, ink drying station settings, curl correction, and other such printer operational settings.

Figure 2:
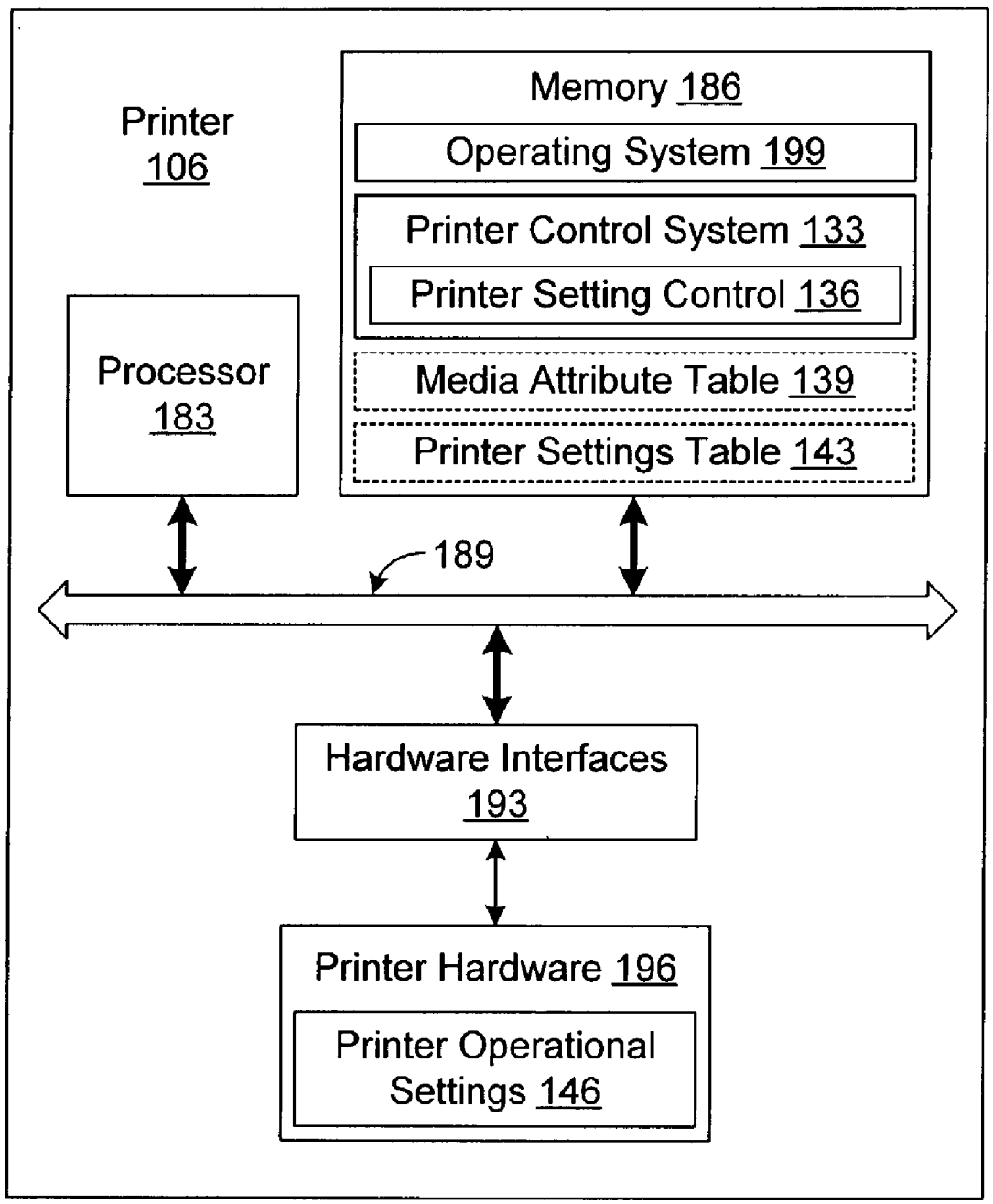
FIG. 2 is a schematic drawing of an exemplary printer employed in the printing network of FIG. 1 according to an embodiment of the present invention.

With reference to FIG. 2 shown is a block diagram of an exemplary printer 106 according to an aspect of the present invention. In this regard, the printer 106 includes a processor circuit having a processor 183 and a memory 186, both of which are coupled to a local interface 189. The printer 106 may also include additional processor circuits. The local interface 189 may be, for example, a data bus with an accompanying control/address bus as can be appreciated by those with ordinary skill in the art. The printer 106 also includes one or more hardware interfaces 193 that provide an interface between the local interface 199 and various printer hardware 196. In this respect, the printer hardware 196 includes the structural components and systems that make up the printer 106 itself. The printer hardware 196 includes the printer operational settings 146 that are associated with the various printing mechanisms in the printer 106 that are adjusted for a particular printing operation.

Stored in the memory 186 and executable by the processor 183 is an operating system 199, the printer control system 133, and the printer setting control 136. In addition, the media attribute table 139 and the printer settings table 143 may also be stored in the memory 186 to be accessed by the printer setting control 186 as is appropriate.

The memory 186 is defined herein as both volatile and nonvolatile memory and data storage components. Volatile components are those that do not retain data values upon loss of power. Nonvolatile components are those that retain data upon a loss of power. Thus, the memory 186 may comprise, for example, random access memory (RAM), read-only memory (ROM), hard disk drives, floppy disks accessed via an associated floppy disk drive, compact discs accessed via a compact disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 183 may represent multiple processors and the memory 186 may represent multiple memories that operate in parallel. In such a case, the local interface 189 may be an appropriate network that facilitates communication between any two of the multiple processors, between any processor and any one of the memories, or between any two of the memories etc. The processor 183 may be electrical, optical, or molecular in nature.

The operating system 199 is executed to control the allocation and usage of hardware resources in the printer 106 such as the memory, processing time and peripheral devices. In this manner, the operating system 199 serves as the foundation on which applications depend as is generally known by those with ordinary skill in the art.

With reference to FIG. 3 shown is the media attribute table 139 according to an embodiment of the present invention. The media attributes 169 are those attributes of the media that affect the ability of the printer 106 (FIG. 1) to print on media while maintaining a uniform image quality from one media type to the next. The media attributes 169 include those that may affect the operation of the printing mechanisms associated with the printer operational settings 146 (FIG. 1) that may be adjusted. In some embodiments, multiple media attributes 169 affect the operation of a single printing mechanism. Also, a single media attribute 169 may affect the operation of multiple printing mechanisms, etc.

The media attributes 169 that may be included in the media attribute table 139 include, for example, texture, shininess, absorption, luminance, gloss, color reflection, color depth, graininess, whiteness, humidity, heat dissipation, adhesion value, and other media attributes 169. Some media types 159 may not include a comprehensive list of all possible media attributes 169. For example, some media only include a few media attributes 169 whereas others may include many media attributes 169. It is from these media attributes 169 that the printer operational settings 146 (FIG. 1) are determined.

Associated with each one of the media attributes 169 is a value that can be converted into an appropriate printer setting using the printer settings table 143 (FIG. 1). In some situations, two or more of the media attributes 169 may be employed to obtain a single printer setting 143 using the printer settings table 143. Alternatively, a printer setting may be calculated directly from one or more of the media attributes 169 using an appropriate equation that is maintained in the printer setting control 136.

With reference to FIG. 4, shown is an example of the printer settings table 143 according to an embodiment of the present invention. The printer settings table 143 associates one or more of the media attributes 169 with one or more of the printer operational settings 146. Specifically, the printer settings table 143 correlates a number of values for respective media attributes 169 with a number of values for respective printer operational settings 146. For example, in the printer settings table 143, a number of heat dissipation values are associated with a corresponding number of fuser temperatures, where the fuser may be employed in a laser printer. Similarly, a number of absorption values of a media are associated with a number of ink flow values as is case with ink jet printers.

Thus, the printer settings table 143 provides a means by which the printer operational settings 146 may be obtained based upon the media attributes 169 associated with the particular media upon which the document 153 (FIG. 1) is to be printed. The actual printer operational settings 146 that are included in the printer settings table 143 may be determined using an empirical process.

Figure 5:
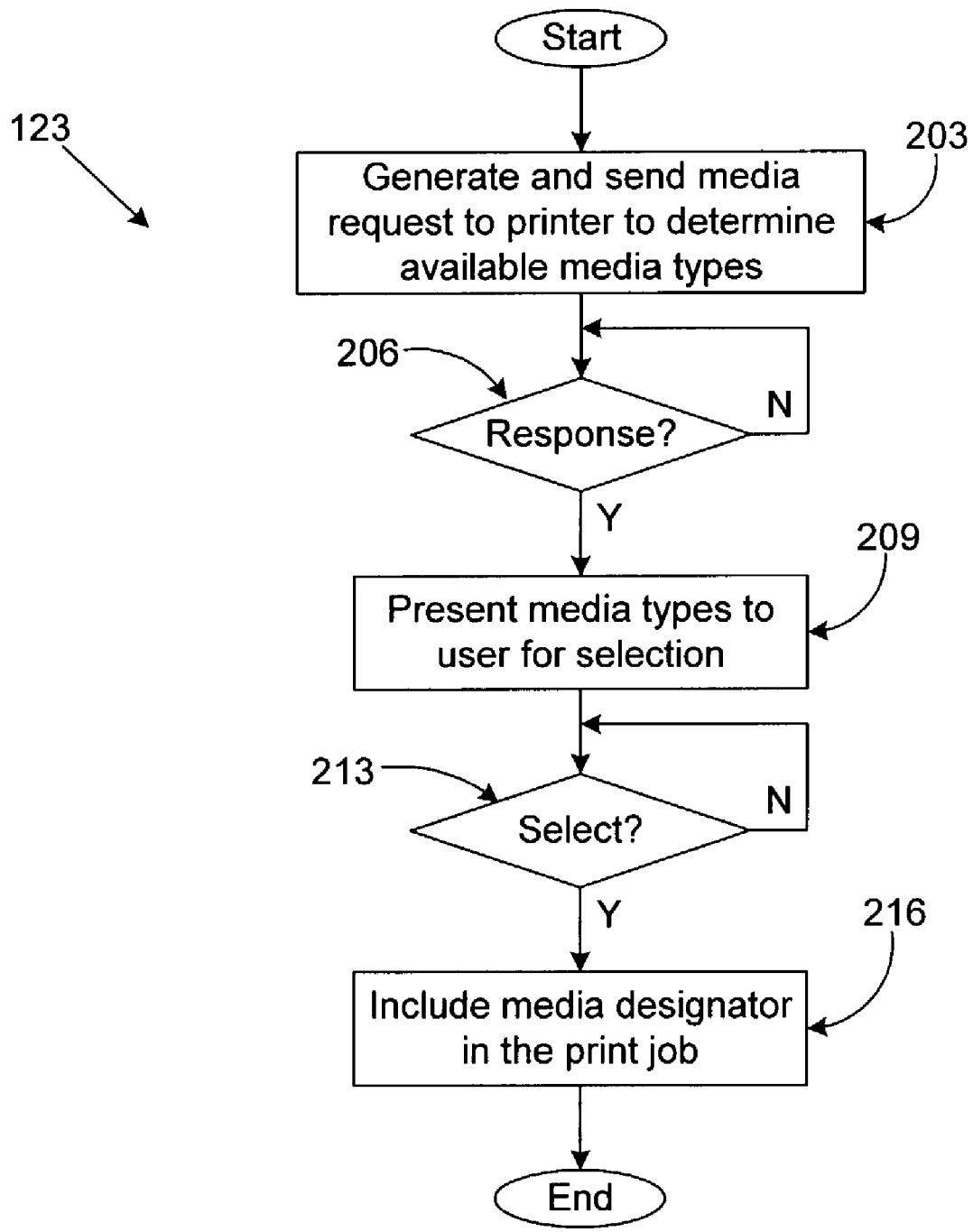
FIG. 5 is a flow chart of an exemplary media specification module employed in a printer driver executed in a client in the printing network of FIG. 1 according to an embodiment of the present invention.

With reference to FIG. 5, shown is a flow chart of an exemplary media specification module 123 according to an embodiment of the present invention. Alternatively, the flow chart of FIG. 5 may be viewed as depicting steps of a method implemented in the client 103 in specifying the media type to be employed to print the document 153 (FIG. 1).

Beginning with box 203, the media specification module 123 generates and sends the media request 156 (FIG. 1) to the printer 106 (FIG. 1) to determine the available media types that are stored in the printer 106 and that may be employed for printing. Thereafter, in box 206, the media specification module 123 waits for a response that includes the media types 159 from the printer 106. Assuming such a response is received, then the media specification module 123 proceeds to box 209 in which the media types 159 (FIG. 1) are presented to a user of the client 103 for selection for use in printing a document 153. The media types 159 may be presented to the user of the client 103 through an appropriate user interface such as, for example, a graphical user interface displayed on a display device or other interface.

Thereafter, in box 213, the media specification module 123 waits for the user to make a selection of the particular media type 159 that is to be used to print the document 153. Once the selection is made, then the media specification module 123 proceeds to box 216 where the print job 163 is created and the media designator 166 is included in the print job. Alternatively, if the media attributes 169 associated with the selected media type are stored in the client 103, then the media specification module 123 may include media attributes 169 themselves in the print job 163. This would save the printer 106 of the obligation of having to retrieve the media attributes 169 from the media attribute table 139, where ever it happens to be stored on the network 113. Thereafter, the media specification module 123 ends as shown.

In addition, with respect to boxes 206 and 213, if proper responses are not forthcoming from the printer 106 after a predetermined period of time, then the error condition may be declared and the print job aborted or at least the media selection portion of the print job may be aborted. In any event, an indication of the particular error condition may be presented to the user using appropriate display device or other interface.

Figure 6:
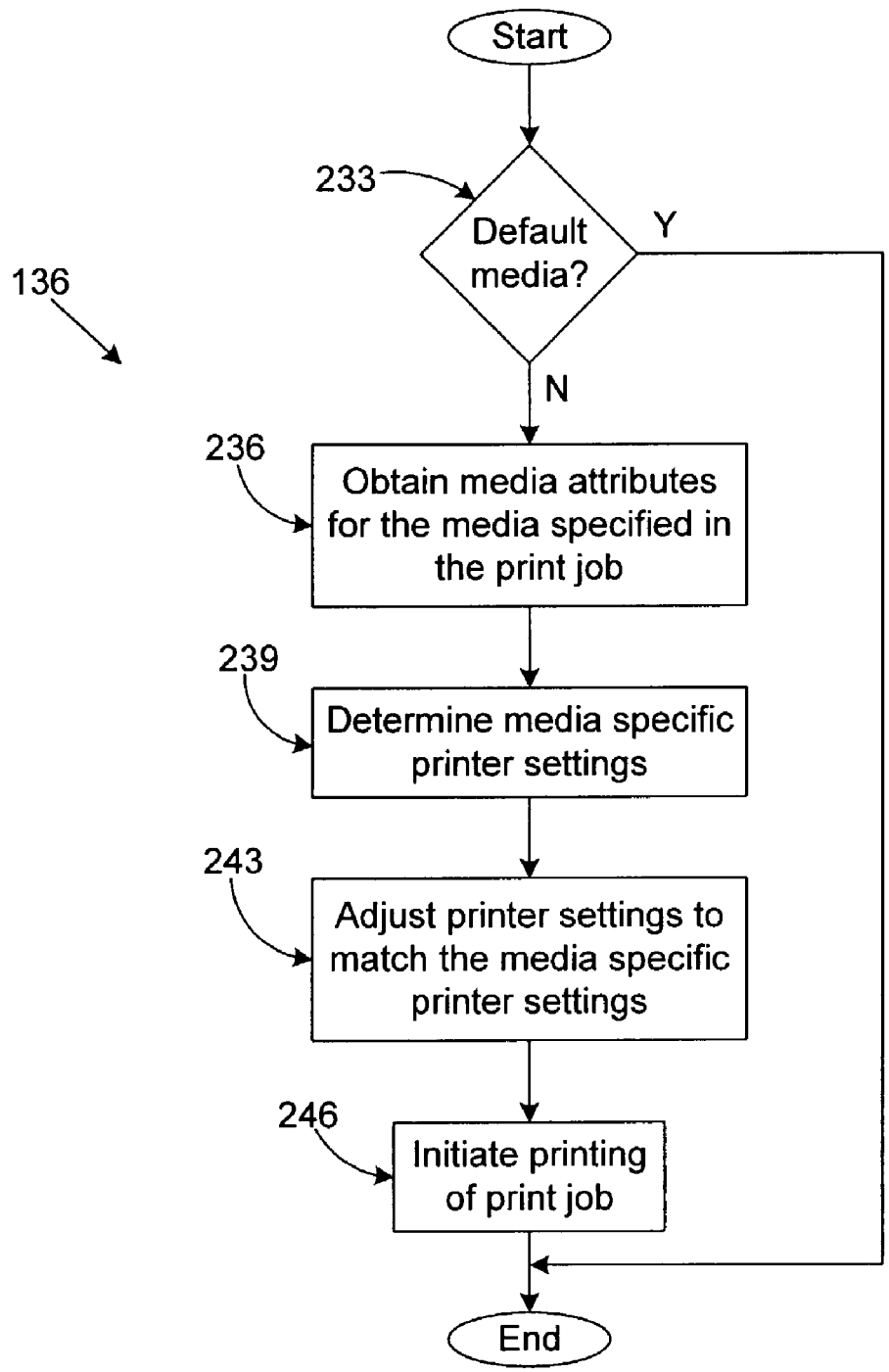
FIG. 6 is a flow chart of an exemplary printer setting control employed in the printing network of FIG. 1 to adjust printer settings to accommodate a specific media type according to an embodiment of the present invention.

With respect to FIG. 6, shown is a flow chart of an exemplary printer setting control 136 according to an embodiment of the present invention. Alternatively, the flow chart of FIG. 6 may be viewed as steps of a method implemented in the printer 106 in order to adjust the printer operational settings 146 to optimize a print operation. This is done in based upon the various media attributes 169 associated with the media selected for the document 153 to be printed on the printer 106 (FIG. 1).

Beginning with box 233, the printer setting control 136 first determines whether a default media has been specified in the print job 163 (FIG. 1). If such is the case, then the printer operational settings 146 that are presumably placed in an initial default condition are maintained and the printer setting control 136 ends as shown. On the other hand, if the default media is not specified in the print job 163, then the printer setting control 136 proceeds to box 236. In box 236, the printer setting control 136 obtains the media attributes 169 for the media specified in the print job 163 using the media designator 166 in the print job 163.

In obtaining the media attributes 169, the media attribute request 173 may be generated and transmitted to the server 109 or the media attribute table 139 may be consulted in the printer 106 if it is stored therein. Alternatively, the media attributes 169 may obtained from the media attribute table 139 located in any device on the network 113 (FIG. 1). Once the media attributes 169 are obtained in box 236, then in box 239, the media specific printer settings are obtained from the printer settings table 143. Alternatively, any one of the media specific printer settings may be obtained by performing a calculation based upon one or more of the media attributes 169. In such case, an equation or other logical operation is maintained in the printer 106 to perform such a calculation.

Next, in box 243, the printer operational settings 146 are adjusted to accord with the media specific printer settings obtained in box 239. Thereafter, in box 246, the remaining print operations to be performed in printing the document 153 are initiated. Thereafter, the printer setting control 136 ends.

Although the media specification module 123 and the printer setting control 136 are embodied in software or code executed by general purpose hardware as discussed above, as an alternative each may also be embodied in dedicated hardware or a combination of software/general purpose hardware and dedicated hardware. If embodied in dedicated hardware, the media specification module 123 and the printer setting control 136 can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, programmable gate arrays (PGA), field programmable gate arrays (FPGA), or other components, etc. Such technologies are generally well known by those skilled in the art and, consequently, are not described in detail herein.

The flow charts of FIGS. 5 and 6 the architecture, functionality, and operation of an implementation of the media specification module 123 and the printer setting control 136. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flow charts of FIGS. 5 and 6 show a specific order of execution, it is understood that the order of execution may differ from that which is depicted. For example, the order of execution of two or more blocks may be scrambled relative to the order shown. Also, two or more blocks shown in succession in FIGS. 5 and 6 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present invention.

Also, where the media specification module 123 and/or the printer setting control 136 comprise software or code, each can be embodied in any computer-readable medium for use by or in connection with an instruction execution system such as, for example, a processor in a computer system or other system. In this sense, the logic may comprise, for example, statements including instructions and declarations that can be fetched from the computer-readable medium and executed by the instruction execution system. In the context of the present invention, a "computer-readable medium" can be any medium that can contain, store, or maintain the media specification module 123 and/or the printer setting control 136 for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, or compact discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Although the invention is shown and described with respect to certain embodiments, it is obvious that equivalents and modifications will occur to others skilled in the art upon the reading and understanding of the specification. The present invention includes all such equivalents and modifications, and is limited only by the scope of the claims.

What is claimed is:

1. A printing method that accounts for a number of characteristics of a print media:
    receiving from a client a print job that includes a document to be printed on a printer;
    obtaining a number of media attributes of a print media associated with the print job from a remote device in data communication with the printer other than the client;
    adjusting a number of operational settings in the printer based upon the media attributes; and
    printing the document on the printer using the print media specified in the print job, wherein the obtaining the media attributes further comprises transmitting a request from the printer for the media attributes to the remote device, the request including a designator that identifies the print media, and receiving the media attributes in the printer from the remote device in response to the request.

2. The method of claim 1, wherein the media attributes are determined solely from the designator.

3. A print operation adjustment system in a printer, comprising:
    a processor circuit having a processor and a memory;
    a printer setting controller stored in the memory and executable by the processor, the printer setting controller comprising:
    logic that transmits from the printer to a remote device a request for a number of media attributes of a print media associated with a print job that includes a document to be printed by the printer, the remote device different from a client that provides the print job to the printer;
    logic in the printer that receives the media attributes from the remote device in response to the request;
    logic that determines a number of media specific values for a respective number of operational settings in the printer based upon the media attributes; and
    logic that adjusts the respective number of operational settings in the printer to the media specific values.

4. The print operation adjustment system of claim 3, wherein the printer setting controller further comprises logic that initiates a printing of the document on the printer.

5. The print operation adjustment system of claim 3, wherein the logic that determines the number of media specific values for the respective number of operational settings in the printer based upon the media attributes further comprises at least one table that correlates the media attributes to the media specific values.

6. The print operation adjustment system of claim 3, wherein the logic that determines the number of media specific values for the respective number of operational settings in the printer based upon the media attributes further comprises logic that calculates at least one of the media specific values from at least one of the media attributes.

7. The print operation adjustment system of claim 3, wherein the media attributes comprise properties of the print media that affect the appearance of the document when printed on the print media, and wherein a value is associated with each of the properties.

8. The print operation adjustment system of claim 3, wherein the media attributes are selected from the group consisting of texture, shininess, absorption, luminance, gloss, color reflection, color depth, graininess, whiteness, humidity, heat dissipation, and adhesion value.

9. The print operation adjustment system of claim 3, wherein the print job includes a media designator that specifies a media type of the print media, and wherein the receiving logic receives the media attributes associated with the media type from the remote device.

10. The system of claim 3, wherein the request including a designator that identifies the print media, and wherein the media attributes are determined solely from the designator.

11. A computer-readable medium encoded with a computer program in a printer for print operation adjustment, comprising:
    code that transmits from the printer to a remote device a request for a number of media attributes of a print media associated with a print job that includes a document to be printed by the printer, the remote device different from a client that provides the print job to the printer;
    code that receives in the printer the media attributes from the remote device in response to the request;
    code that determines a number of media specific values for a respective number of operational settings in the printer based upon the media attributes; and
    code that adjusts the respective number of operational settings in the printer to the media specific values.

12. The computer-readable medium of claim 11, further comprising code that initiates a printing of the document on the printer.

13. The computer-readable medium of claim 11, wherein the code that determines the number of media specific values for the respective number of operational settings in the printer based upon the media attributes further comprises at least one table that correlates the media attributes to the media specific values.

14. The computer-readable medium of claim 11, wherein the code that determines the number of media specific values for the respective number of operational settings in the printer based upon the media attributes further comprises code that calculates at least one of the media specific values from at least one of the media attributes.

15. The computer-readable medium of claim 11, wherein the media attributes comprise properties of the print media that affect the appearance of the document when printed on the print media, and wherein a value is associated with each of the properties.

16. The computer-readable medium of claim 11, wherein the media attributes are selected from the group consisting of texture, shininess, absorption, luminance, gloss, color reflection, color depth, graininess, whiteness, humidity, heat dissipation, and adhesion value.

17. The computer-readable medium of claim 11, wherein the print job includes a media designator that specifies a media type of the print media, and wherein the code that receives the media attributes receives the media attributes associated with the media type from the remote device.

18. A print operation adjustment system, comprising:
   means for transmitting from a printer to a remote device a request for a number of media attributes of a print media associated with a print job that includes a document to be printed by the printer, the remote device different from a client that provides the print job to the printer;
   means for receiving the media attributes at the printer from the remote device in response to the request;
   means for determining a number of media specific values for a respective number of operational settings in the printer based upon the media attributes;
   means for adjusting the respective number of operational settings in the printer to the media specific values; and
   means for initiating a printing of the document on the printer.

19. The print operation adjustment system of claim 18, wherein the means for determining the number of media specific values for the respective number of operational settings in the printer based upon the media attributes further comprises at least one table that correlates the media attributes to the media specific values.

20. The print operation adjustment system of claim 18, wherein the mean for determining the number of media specific values for the respective number of operational settings in the printer based upon the media attributes further comprises means for calculating at least one of the media specific values from at least one of the media attributes.

21. A printing method that accounts for a number of characteristics of a print media, comprising:
   receiving at a printer from a client a print job that includes a document to be printed on the printer;
   transmitting a request for a number of media attributes of a print media associated with the print job from the printer to a remote device in data communication with the printer other than the client;
   receiving at the printer the media attributes from the remote device in response to the request;
   adjusting a number of operational settings in the printer based upon the media attributes; and
   printing the document on the printer using the print media specified in the print job.

22. The method of claim 21, wherein the adjusting of the number of operational settings in the printer based upon the media attributes further comprises determining the operational settings based upon the media attributes.

23. The method of claim 22, wherein the adjusting the operational settings based upon the media attributes further comprises storing at least one table that correlates a number of setting values for at least one of the operational settings with a corresponding number of media attribute values for at least one of the media attributes.

24. The method of claim 23, wherein the adjusting the operational settings based upon the media attributes further comprises looking up the operational settings in the at least one table.

25. The method of claim 21, wherein the adjusting of the number of operational settings in the printer based upon the media attributes further comprises providing a formula that calculates at least one of the operational settings from at least one of the media attributes.

26. The method of claim 25, wherein the adjusting of the number of operational settings in the printer based upon the media attributes further comprises calculating the at least one of the operational settings from the at least one of the media attributes using the formula.

27. The method of claim 21, wherein the media attributes comprise properties of the print media that affect the appearance of the document when printed on the print media, and wherein a value is associated with each of the properties.

28. The method of claim 21, wherein the media attributes are selected from the group consisting of texture, shininess, absorption, luminance, gloss, color reflection, color depth, graininess, whiteness, humidity, heat dissipation, and adhesion value.

29. The method of claim 21, wherein the print job includes a media designator that specifies a media type of the print media, and wherein the obtaining the media attributes, obtains the media attributes associated with the media type.

30. The method of claim 21, wherein the request including a designator that identifies the print media, and wherein the media attributes are determined solely from the designator.

* * * * *

UNITED STATES PATENT AND TRADEMARK OFFICE
CERTIFICATE OF CORRECTION

PATENT NO. : 7,280,242 B2
APPLICATION NO. : 10/191611
DATED : October 9, 2007
INVENTOR(S) : George Bradley Hobbs It is certified that error appears in the above-identified patent and that said Letters Patent is hereby corrected as shown below:

In column 10, line 52, in Claim 29, after "attributes" delete ",".

Signed and Sealed this

Fourteenth Day of October, 2008

JON W. DUDAS
*Director of the United States Patent and Trademark Office*